United States Patent [19]

Hemmersbach et al.

[11] Patent Number: 5,129,162
[45] Date of Patent: Jul. 14, 1992

[54] METHOD AND APPARATUS FOR LOADING AND UNLOADING CONTAINERS FROM FREEZE-DRYING EQUIPMENT

[75] Inventors: Siegfried Hemmersbach, Cologne; Heinz May, Pulheim, both of Fed. Rep. of Germany

[73] Assignee: Leybold Aktiengesellschaft, Fed. Rep. of Germany

[21] Appl. No.: 506,865

[22] Filed: Apr. 9, 1990

[51] Int. Cl.⁵ .............................. F26B 13/30
[52] U.S. Cl. .......................... 34/5; 34/236; 34/217; 34/92
[58] Field of Search ............... 34/5, 15, 92, 217, 236; 414/331, 787; 211/130, 149, 201

[56] References Cited

U.S. PATENT DOCUMENTS

| | | | |
|---|---|---|---|
| 3,184,862 | 5/1965 | Frank | 34/5 |
| 3,232,068 | 2/1966 | Thuse | 34/5 |
| 3,469,327 | 9/1969 | Janovtchik et al. | 34/236 |
| 3,769,717 | 11/1973 | Lorentzen et al. | 34/92 |
| 3,831,293 | 8/1974 | Ingram et al. | 34/236 |
| 4,104,805 | 8/1978 | Margittai | 34/5 |
| 4,396,338 | 8/1983 | Applegate et al. | 414/331 |
| 4,506,455 | 3/1985 | Rossi | 34/5 |

Primary Examiner—Henry A. Bennet
Assistant Examiner—Denise L. F. Gromada
Attorney, Agent, or Firm—Hill, Van Santen, Steadman & Simpson

[57] ABSTRACT

A method and apparatus for loading and unloading freeze-drying apparatus including at least one placement surface adapted to receive containers holding a product to be freeze-dried. The containers are placed on a table top of a transfer table, and the transfer table is brought into proximity with the placement surface in a chamber of a freeze-drying apparatus. A retractable frame assembly, movably secured to the transfer table, is used to transfer the containers from the transfer table top to the placement surfaces. The frame assembly is retracted from the chamber, and the freeze-drying process may then be implemented. Upon completion of freeze-drying, the frame assembly is introduced into the chamber, and is actuated to transfer the containers from the placement surfaces to the transfer table.

26 Claims, 5 Drawing Sheets

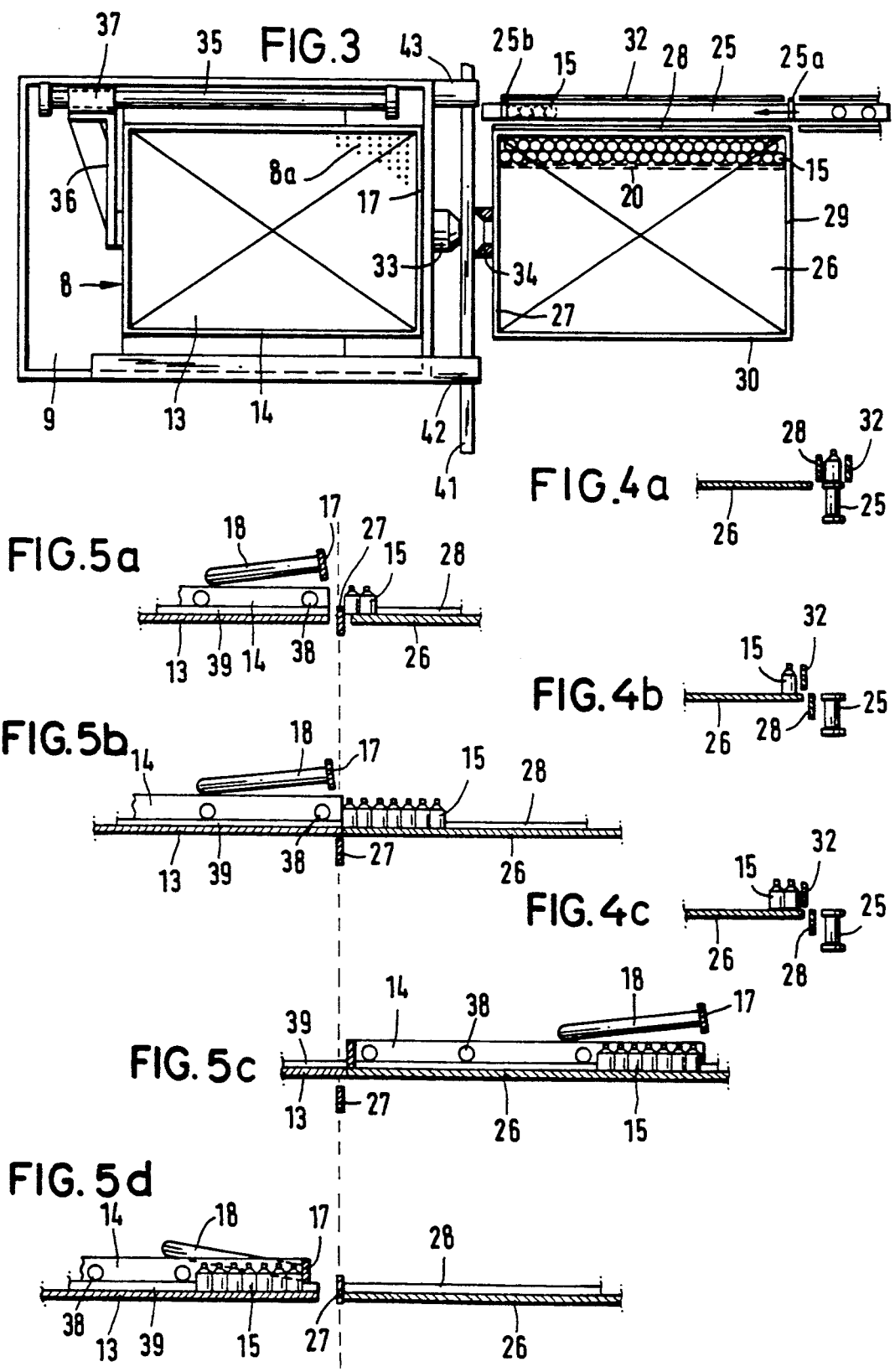

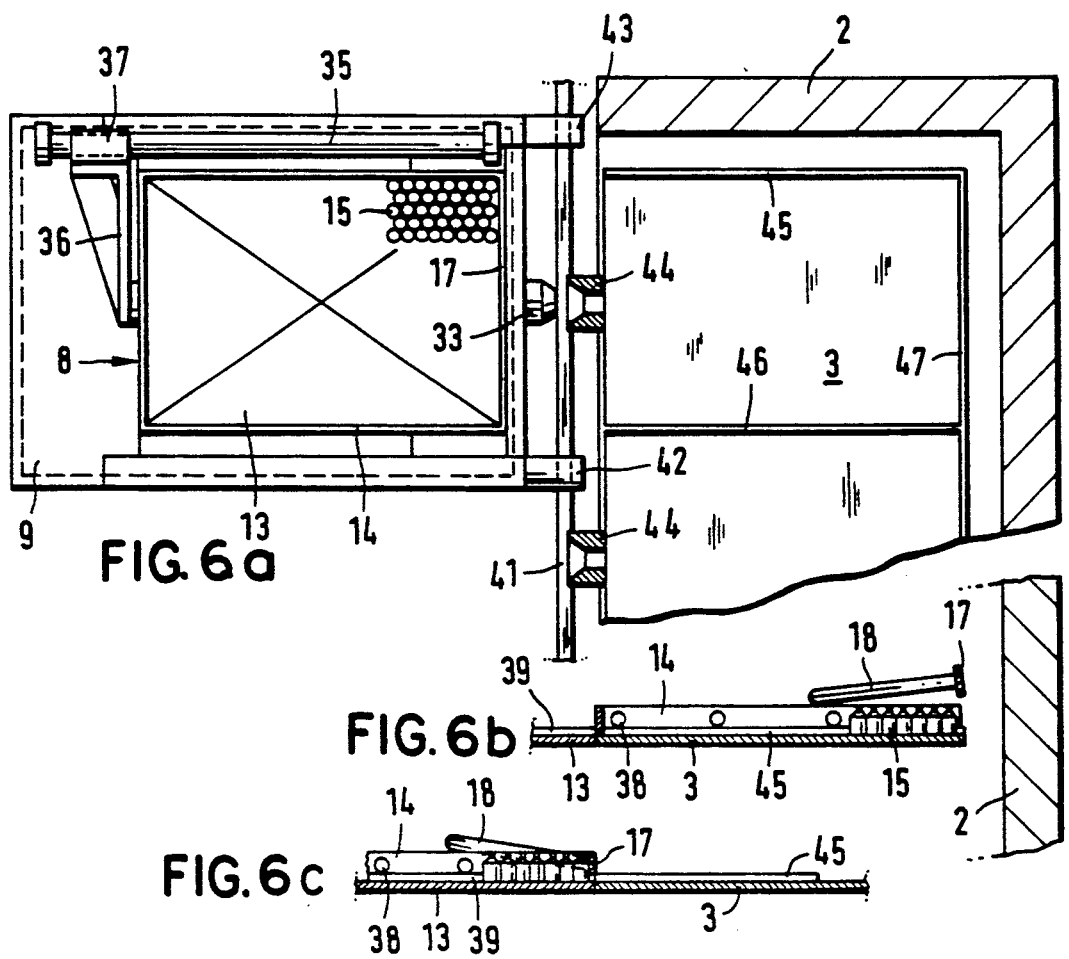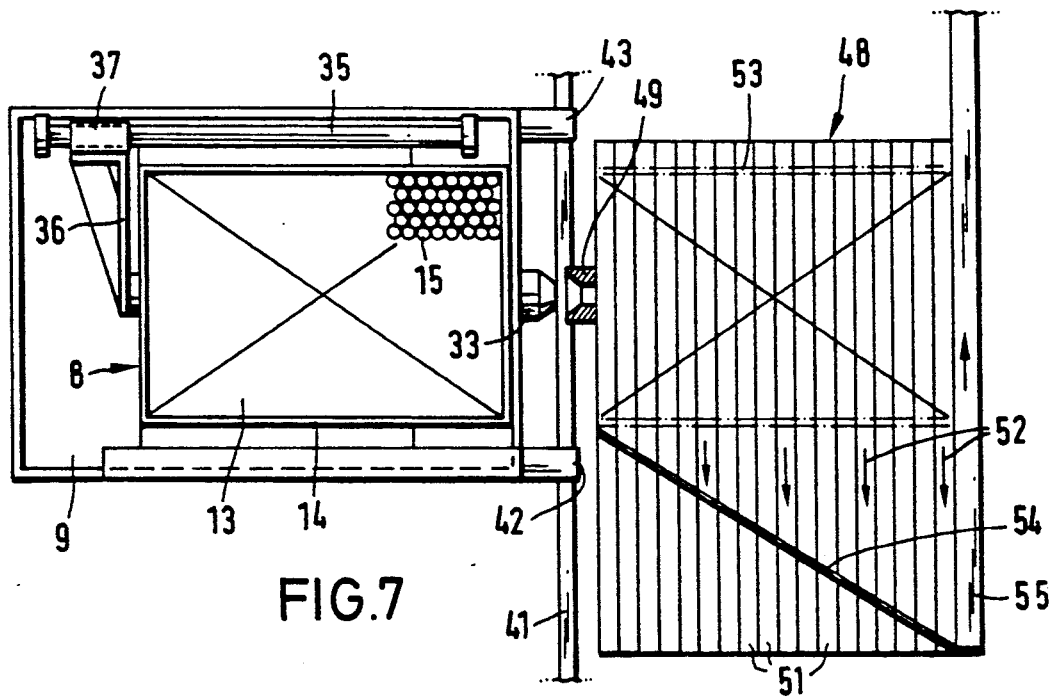

METHOD AND APPARATUS FOR LOADING AND UNLOADING CONTAINERS FROM FREEZE-DRYING EQUIPMENT

TECHNICAL FIELD

The invention is directed to a method and apparatus for loading and unloading containers from freeze-drying equipment, where the equipment includes at least one placement surface upon which the containers, which contain the product to be freeze-dried, are received.

BACKGROUND OF THE INVENTION

Freeze-drying is mainly utilized for preserving temperature sensitive products while maintaining certain desirable characteristics of the products. Freeze-drying is extensively employed in the fields of pharmacology, biology and medicine.

The freeze-drying process involves removing substantially all of the water from the product to be preserved. The standard freeze-drying process can be generally summarized as follows:

First, the product is frozen in order to convert the water present in the product to ice. Next, in a main drying step, the product is subjected to a vacuum of approximately $10^{-}$ mbar, which causes sublimation of the ice to occur.

The main drying step is followed by a supplemental drying step, in which the adsorptively bonded water is removed in order to obtain an extremely low level of residual moisture. During supplemental drying, the product is heated to a predetermined temperature under a vacuum of approximately $10^{-3}$ mbar.

Since freeze-drying is usually practiced as a batch process, efforts have been undertaken to process the largest possible batches within the constraints of available equipment. In present practice, the monetary value of such batches is extremely high, often exceeding one million German marks (approximately $580,000.00). Therefore, from an economic standpoint alone, it is important to minimize the potential for loss of such batches due to contamination of the product.

A significant potential for product contamination exists during loading and unloading of the product containers from the freeze-drying process chamber. Loading and unloading of the containers is usually performed manually. The containers holding the product to be dried (up to 100,000 bottles per batch) are conveyed from a filling station to the freeze-drying equipment, and are manually placed onto placement surfaces within the chamber. The containers are loaded and unloaded using platters that remain in the freeze-drying chamber during the freeze-drying process.

Since the containers having the product to be freeze-dried are initially open, it is of particular importance that loading be performed under extremely clean conditions. Before loading, the containers are loosely covered with a plug having a water vapor escape passage. After the containers have been loaded onto the placement surfaces, the freeze-drying process is implemented as described hereinabove. After completion of the process the placement surfaces, which generally vertically overlie one another within the chamber, are brought together within the chamber, thus causing the plugs to close the containers at a predetermined pressure.

British Patent No. GB-A-21 85 969 discloses an apparatus for loading and unloading freeze-drying equipment. In this apparatus, containers are continuously supplied via a conveyor belt, and are successively placed onto transfer plates that are moved into the freeze-drying chamber in succession. With each transfer, only a relatively small number of containers is introduced into the freeze-drying chamber. Consequently, loading of the containers into the freeze-drying chamber is more time consuming than is desirable. Furthermore, the apparatus necessitates contact between the transfer plates and the upper sides of the placement surfaces, since the transfer plates must rest on the placement surfaces in order to avoid upsetting the containers during transfer. Such contact produces a significant degree of friction, which not only generates heat, but may lead to an abrasion of contact surfaces which increases the potential for contamination of the product.

It is therefore apparent that there exists a need for a method and apparatus for loading and unloading containers into freeze-drying equipment that will simplify and accelerate the handling of large batches of containers, while simultaneously reducing the risk of product contamination.

SUMMARY OF THE INVENTION

The present invention provides a method of loading containers onto placement surfaces disposed in a chamber of a freeze-drying apparatus, wherein the containers are first arranged on a table top of a transfer table, the transfer table being provided with a selectively actuable and retractable frame assembly. The table top is brought into proximity with one of the placement surfaces, and a portion of the frame assembly is brought into engagement with the containers. The frame assembly is then actuated to transfer the containers from the transfer table to the placement surface. The frame assembly is then retracted from the freeze-drying chamber, and the freeze-drying process may be carried out.

In unloading the chamber according to the present invention, the transfer table is again brought into proximity with one of the placement surfaces, and the frame assembly is introduced into the chamber, and brought into engagement with the containers. The frame assembly is then actuated to transfer the containers from the placement surface to the transfer table.

Compared to previously known devices, one advantage of the present invention is that it significantly reduces the time required to load a high number of containers into a freeze-drying chamber.

A further advantage of the invention is that it automates the loading and unloading of freeze-drying equipment, thus eliminating the need for additional frames or loading platters, which not only represent an additional expense, but interfere with heat transfer between the placement surfaces and the product containers.

In one embodiment of the invention, the containers holding the product to be freeze-dried are first collected on a formatting table corresponding in size to the transfer table. The frame assembly is then used to transfer the containers from the formatting table to the transfer table top.

After removal of the containers from the freeze-drying chamber, the frame assembly of the transfer table can also be used to transfer the containers from the transfer table to a conveyor system.

In order to minimize friction between the containers and the various surfaces, for example the formatting table and the transfer table, with which the containers come into contact, these surfaces may be provided with a low friction plastic coating.

Further friction reduction is achieved by keeping the placement surfaces and other potentially friction generating surfaces at a temperature that lies below the freezing point. Due to the condensation of atmospheric humidity, a thin layer of ice is formed on the surfaces, thus providing a virtually friction free transfer of containers.

Friction may also be reduced, and risk of contamination minimized, by providing a cushion of pressurized gas on the transfer table top.

The invention also includes an apparatus for implementing the above-described method steps. The apparatus includes a transfer table having a table top, the transfer table being both mobile and adjustable. A frame assembly is secured to the transfer table for movement relative thereto, the frame assembly being engageable with the containers to affect movement of the containers between the placement surfaces and the transfer table top.

The transfer table may be linearly displaceable, rotatable, and/or height adjustable, in order to allow a number of steps, previously executed manually, to be automatically performed. This not only significantly decreases the time required for loading and unloading the freeze-drying equipment, but reduces the need for human presence in the loading/unloading clean room area in which the freeze-drying equipment is located, thus significantly reducing the risk of contamination of the product.

Others objects and advantages of the present invention will become apparent upon reference to the accompanying description when taken in conjunction with the following drawings.

BRIEF DESCRIPTION OF THE DRAWINGS

FIG. 3 is a schematic plan view of a transfer table and formatting table according to the present invention.

FIGS. 4a through 4c are schematic sectional views illustrating transfer of containers onto the formatting table.

FIGS. 5a through 5d are schematic sectional views of transfer of containers from the formatting table onto the transfer table.

FIGS. 6a through 6c are schematic sectional views illustrating unloading of the containers from the freeze-drying chamber.

FIG. 7 is a schematic plan view of a transfer table and conveyor system forming a part of the present invention.

DETAILED DESCRIPTION OF THE PREFERRED EMBODIMENTS

Figure 1:
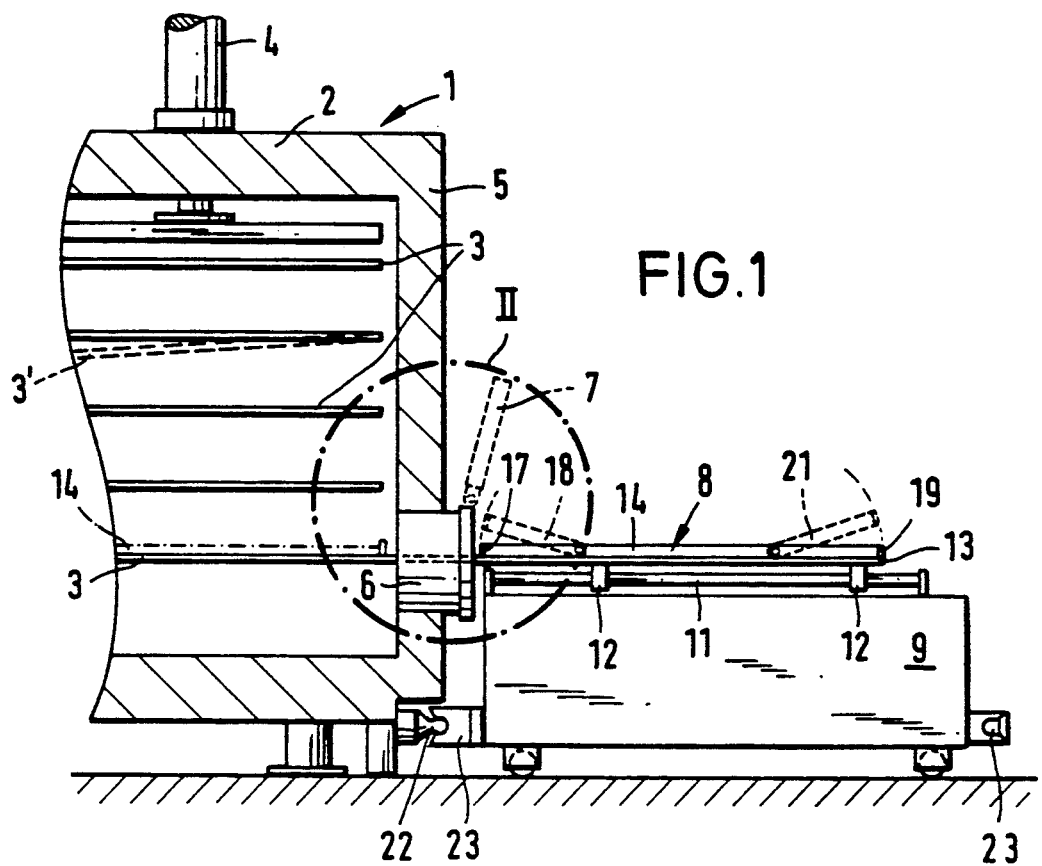
FIG. 1 is a partial sectional view through freeze-drying equipment embodying aspects of the present invention.

FIG. 1 shows a freeze-drying apparatus 1 including a freeze-drying chamber 2 in which placement surfaces 3 are disposed. The placement surfaces 3 are vertically displaceable within the chamber 2 using a cylinder piston arrangement 4. Vertical displacement of the placement surfaces 3 allows adjustment of the height of the placement surfaces, thus enabling the placement surfaces to be set at a defined loading height. Furthermore, after completion of freeze-drying of the product, the placement surfaces can be pushed together in order to close the plugs 16 of the containers 15.

A wall 5 of the chamber 2 is provided with an opening 6 that can be closed with a cover 7. A transfer table 8 is movably mounted on a charging carriage 9 using a guide rail assembly 11 including spindle nuts 12. The transfer table 8 includes a table top 13 and a frame assembly 14 that is movable relative to the table top 13.

Figure 2:
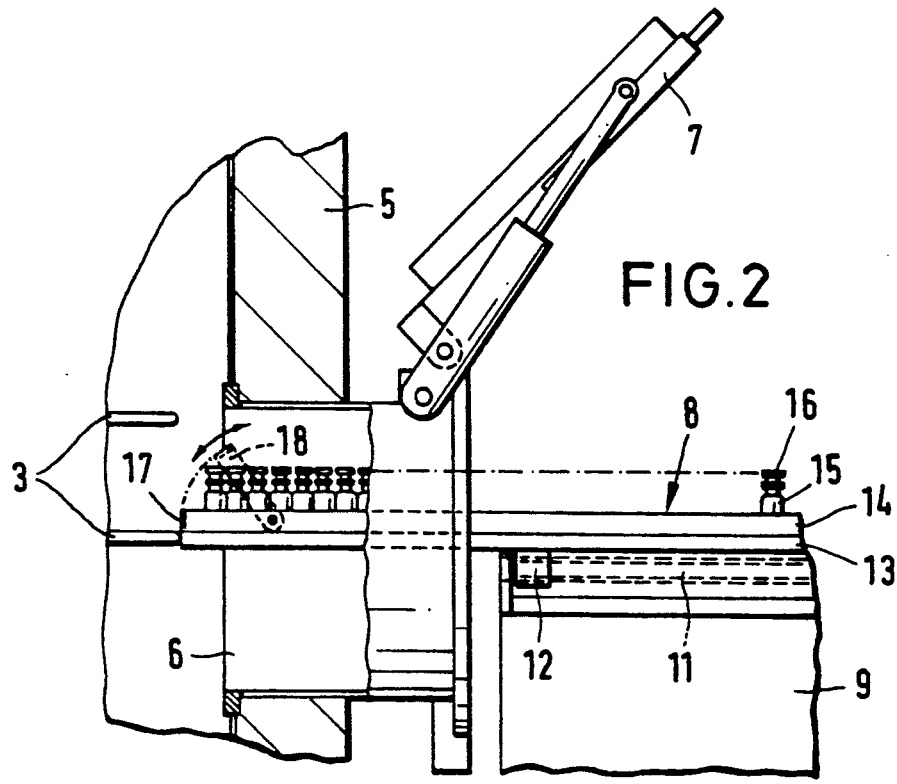
FIG. 2 is a detailed view of the transfer region of the embodiment shown in FIG. 1.

FIG. 2 is a detailed view of the opening 6 in the chamber wall 5. The guide rail assembly 11, 12 allows the transfer table 8 to be brought into proximity with the placement surface 3, such that the placement surface and the table top 13 of the transfer table 8 are substantially coplanar. The frame assembly 14 surrounds a plurality of containers 15 that are arranged on the transfer table 8 with plugs 16 only loosely overlying the containers 15. Actuation of the frame 14 to the position shown in broken line in FIG. 1 causes the containers 15 to be transferred from the transfer table top 13 onto the placement surface 3.

The frame assembly 14 includes a pivoting gate portion having an edge 17 attached to the sides of the frame 14 using side arms 18. After movement of the frame 14 to the broken line position of FIG. 1, the pivoting gate portion 17, 18 is lifted to the retracted position shown in broken line in FIG. 2, and the frame 14 is then retracted from the chamber 2. The containers 15 remain on the placement surface 3. After the desired number of placement surfaces 3 have been filled, the cover 7 is closed, and the freeze-drying process may begin.

In the embodiment shown in FIG. 1, the transfer table 8 must be refilled with containers 15 before loading each of the placement surfaces 3. As shown in detail in FIGS. 3 through 5d, this can be accomplished through the use of a formatting table 26, arranged opposite the freeze-drying apparatus 1. The frame assembly 14 includes a second gate portion 19, 21 opposite the gate portion 17, 18. This allows the frame assembly 14 to be put into a position surrounding the containers 15 on the formatting table 26, after which the edge 19 is lowered, and the frame assembly 14 retracted so that the containers are transferred from the formatting table 26 to the transfer table 8.

In the apparatus shown in FIGS. 1 through 3, the placement surface 3, the table top 13 of the transfer table 8, and the formatting table 26 are positioned in proximity with one another in generally coplanar relationship. In order to ensure proper positioning, the charging carriage 9 is provided with a pin guide 23 adapted to receive a pin 22 attached to the freeze-drying apparatus. Similarly, the charging carrier 9 is provided with a pin 33 adapted to be received in a pin guide 34 on the formatting table 26.

As shown in FIG. 3, the formatting table 26 includes a belt 25 and transfer mechanism 25a through 32 that facilitate placement of the containers 15 onto the formatting table 26. In the illustrated embodiment, the belt 25 extends laterally of the formatting table 26. The formatting table includes edges 27, 28, 29, and 30. Of the edges 27 through 30, the edges 27 and 28 can be selectively lowered. Furthermore, the edge 28 serves the additional purpose of guiding the containers on the belt 25. A laterally displaceable outer guide 32 is provided on a side of the belt 25 opposite the edge 28. A feed block 25a and adjustable stop 25b extend across the belt 25a.

Transfer of the containers from the belt to the formatting table is as follows:

The containers 15 are carried by the belt 25 until they reach the stop 25b, and extend the full length of the belt 25. A sensor (not shown) detects this condition, actuates the feed block 25a, and stops the belt 25. The edge 28 is then lowered, so that the guide 32 may be actuated to push a row of containers 15 onto the formatting table 26, as shown in FIG. 4b. Subsequently, the guide 32 is moved back to its initial position and the edge 28 is lifted, so that the next row of containers 15 can be brought into position on the belt 25. This procedure is repeated with successive rows, as shown in FIG. 4c, until the formatting table 2 is filled with containers.

The stop 25b is selectively positionable along the longitudinal axis of the belt 25 in order to position the individual rows of containers 15 to be slightly offset. This facilitates an optimal distribution of containers 15 on the formatting table 26, as shown in FIG. 3.

A laterally displaceable damming rail 20 (FIG. 3) is provided to support the front row containers 15 during loading, thus preventing the containers 15 from tilting. In order to unload the formatting table after the freeze-drying process has been completed, the loading procedures described above are reversed, and the damming rail 20 used to urge the containers 15 toward the belt 25.

In order to reduce friction, the placement surfaces 3, the transfer tables 8, and the formatting table 26 may be cooled to a temperature below 0° C., thus causing a film of ice to form on surfaces of the various components. Alternatively, the table top 13 of the transfer table 8 may be provided with a plurality of bores 8a of exceedingly small diameter. The bores 8a are connected to a pressurized supply of inert gas (not shown). In addition to providing an anti-friction gas cushion beneath the containers 15, the bores 8a provide an extremely clean gas stream to be maintained above the containers 15, thus further preventing contamination of the product. In order to facilitate circulation of the inert gas, the charging carriage 9 may be covered with a hood (not shown) to receive the gas from the bores 8a.

After the formatting table 26 has been completely filled with containers 15, the edge 27 is lowered and the transfer table 8 is brought into proximity with the formatting table 26, as shown in FIGS. 5a through 5d. The pin 33 and the pin guide 34 ensure correct relative positioning of the charging carrier 9 and the formatting table 26.

In order to transfer containers from the formatting table to the transfer table, the gate portion 19, 21 is pivoted upwardly, and the frame assembly 14 is moved along the guide rail assembly 35 through 37 to the position shown in FIG. 5c. Note that the frame assembly 14 includes rollers 38 that are supported on edges 39 of the transfer table and edges 28 and 30 of the formatting table. The various edges thus provide a form of "running rails" for the rollers 38.

Next, the gate portion 19, 21 is lowered, and the frame assembly 14 drawn back to a position over the table top 13, thus transferring the containers 15 from the formatting table 26 to the transfer table 8 as shown in FIG. 5d.

FIGS. 6a through 6c illustrate an alternative embodiment of the present invention. In this embodiment, the placement surface 3 is at least twice as wide as the table top 13 of the transfer table 8. Therefore, the transfer table 8 must be moved laterally in order to completely fill the placement surface 3 with containers 15. Similar to the previously disclosed embodiments, the pin 33 may be received in the pin guides 44 in order to insure proper positioning of the transfer table 8.

Transfer of the containers from the table top 13 to the placement surface 3 is accomplished as previously described with reference to the frame assembly 14. The frame assembly 14 is moved, together with the containers 15, into the freeze-drying chamber as shown in FIG. 6b. After the pivoting gate portion 17, 18 is lifted, the frame assembly 14 is retracted, and the containers 15 remain on the placement surface 3. Unloading of the placement surface 3 is accomplished by reversing the steps, and the gate portion 17, 18 is employed in its lowered position as shown in FIG. 6c.

The placement surface 3 is provided with edges 45 through 47 that serve to prevent the containers 15 from falling off of the placement surface 3. The edges 45, 46 are substantially contiguous with the edges 39 of the transfer table top 13, and thus also serve as running rails for the rollers 38 of the frame assembly 14. In order to retain the containers 15 on the placement surfaces 3 during the freeze-drying process, a louvered interlock (not shown) can be provided at the loading side of the placement surfaces 3 after loading of the containers 15. Alternatively, the placement surfaces 3 may be inclined with respect to the horizontal, so that the containers 15 are urged towards and against the edge 47 facing away from the loading and of the placement surfaces 3. An inclined placement surface 3 is shown in FIG. 1. Provision of such an inclined arrangement eliminates the need for a mechanical, louvered interlock, thus further reducing complexity of the system.

As shown in FIG. 7, the load/unload assembly of the present invention may include a conveyor system 48 having an unloading region with a plurality of belts 51 running in the direction of the arrows 52. The extent of the conveyor system 48 is defined by guides 53, 54. The oblique guide 54 causes the containers 15 on the belts 51 to proceed toward the belt 55 gradually. The belt 55 has a running direction opposite that of the belts 51, and is used to convey the now closed containers 15 to a packing station (not shown).

Figure 8:
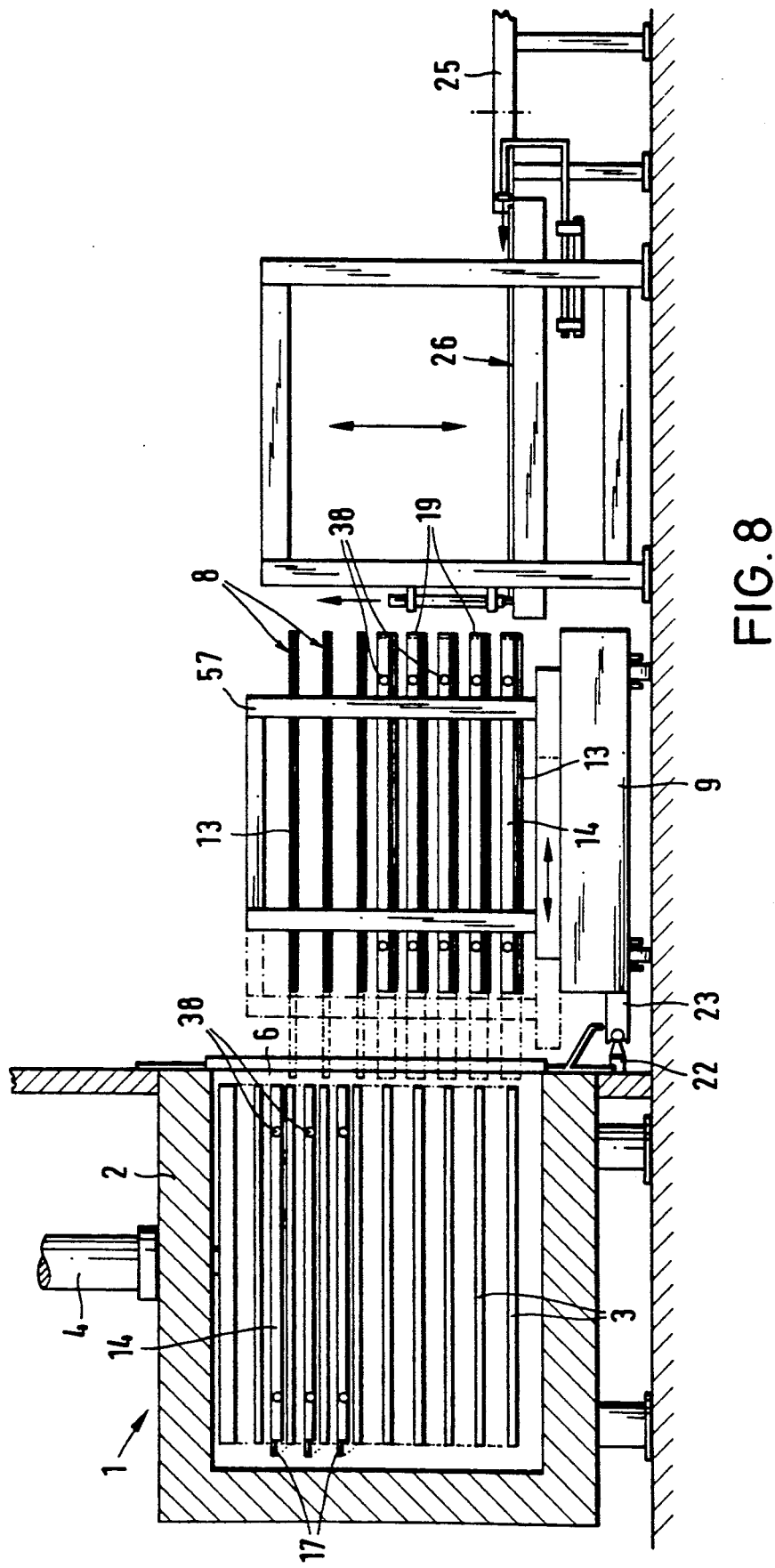
FIG. 8 is a part sectional view of a second embodiment of the present invention.

FIG. 8 illustrative of yet another embodiment of the present invention, in which a plurality of transfer tables 8 are provided and arranged in a generally vertical alignment. The number and spacing of the transfer tables 8 correspond to the number and spacing of placement surfaces in the freeze-drying apparatus. The transfer tables are supported in a rack 57 that is carried by the charging carriage 9. The rack 57 is horizontally displaceable, so that the transfer tables 8 can be aligned with the placement surfaces 3. Guide rail assemblies similar to those previously described can be used to position the placement surfaces and the table tops relative to one another.

Loading of the freeze-drying apparatus of FIG. 8 is as follows:

Containers having the product to be freeze-dried are first delivered via the belt 25 in a similar fashion to the described with reference to FIGS. 3 through 5. After the placement surface of the formatting table 26 is filled with containers, the formatting table 26 is brought into planar alignment with the respective table tops 13 of the transfer tables 8, so that the containers can be transferred from the formatting table to the transfer tables 8 using the respective frame assemblies 14. After the transfer tables 8 have been filled, the transfer tables are brought into alignment with the placement surfaces 3. Loading of the placement surfaces 3 proceeds as described with reference to FIGS. 6a through 6c. The frame assemblies 14 may be simultaneously actuated, so that the placement surfaces 3 may be simultaneously loaded with containers.

Figure 9:
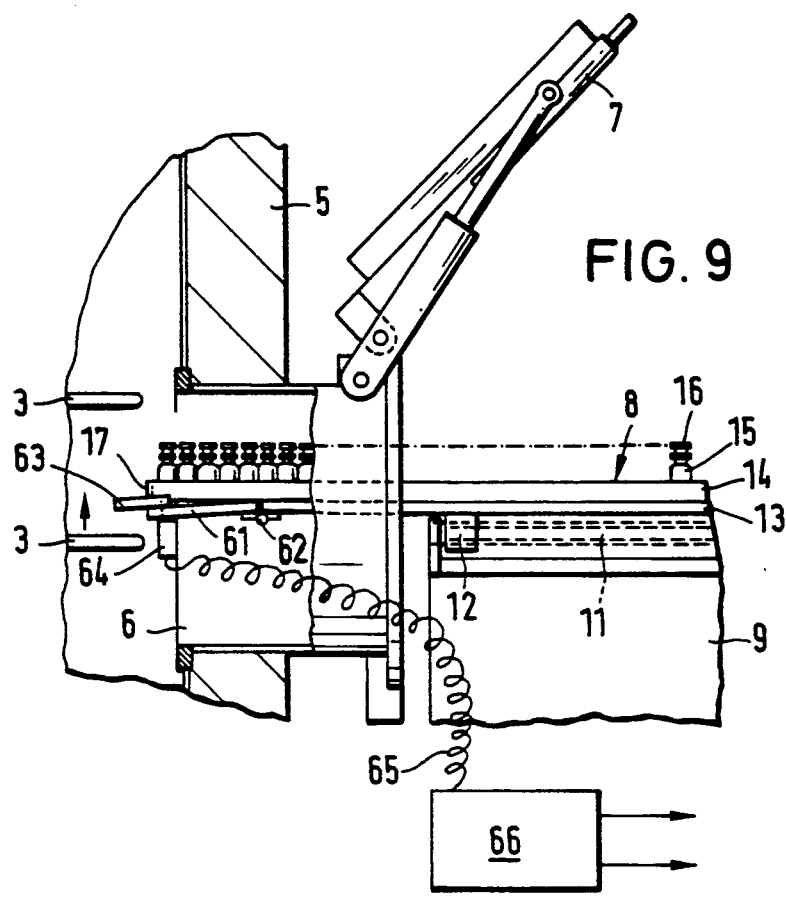
FIG. 9 is a view similar to FIG. 6, illustrating an alternative embodiment.

In order for the containers 15 to be transferred from the formatting table 26 to the transfer table 8, and subsequently from the transfer tables 8 to the placement surfaces 3, it is important that the various surfaces are coplanar with one another during transfer. Towards this end, the embodiment of the invention shown in FIG. 9 provides a table top 13 having an articulated edge section 61. Depending upon the particular configuration employed, articulated edge sections may be provided either on one side or on opposite sides of the transfer table. The edge section 61 is secured to the main section of the table top 13 via a hinge member 62 or other suitable flexible attachment. The edge section 61 includes a pair of oppositely located abutment extensions 63.

A proximity switch 64 is disposed adjacent the edge section 61, so that the edge section 61 rests upon the proximity switch 64. The switch 64 is used to limit the degree of inclination of the edge section 61 to avoid tipping the containers 15. The proximity switch 64 is operatively connected to a control block 66 by a line 65. This control block 66 is also used to actuate movement of the placement surfaces 3 with the element 4, or downward motion of the transfer table 8.

Operation of the articulated edge section 61 is as follows:

The placement surface 3 and the transfer table 8 are positioned so that the abutment extensions 63 rest on the placement surface 3. Relative movement of the placement surface 3 and the table top 13 is continued until the edge section 61 is lifted off of the proximity switch 64, which then generates a signal to terminate relative movement of the placement surface 3 and the table top 13. This insures that the placement surface 3, the table top 13, and the articulated edge section 61 form a suitable surface for transfer of the containers 15.

Figure 10:
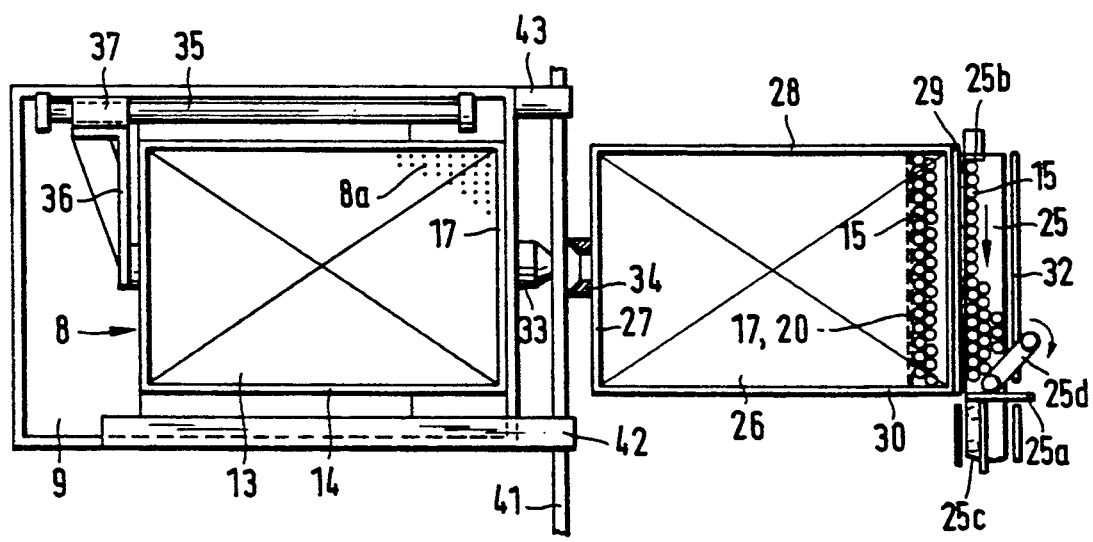
FIG. 10 is a plan view of an alternative removal system.

FIG. 10 shows an alternative embodiment for transferring containers to and from the formatting table. In this embodiment, a conveyor belt 25 is provided that is approximately three times the diameter of the containers 15. The edges 26 through 29 and 32, and the damming region 20 function as described with reference to FIGS. 4a through 4c. During removal of the containers 15 from the formatting table 26, the containers 15 are urged toward the belt 25, using either the damming rail 20 or the edge 17 of the frame assembly 14. The belt 25 accepts multiple rows of the containers 15, and conducts them to a narrow section 25c, which can receive only a single row. In order to facilitate the transition from multiple rows to one row, an oblique guide belt 25d is provided. The belt 25d travels in a direction generally opposite that of the belt 25, and contacts the side walls of the containers, thus causing them to rotate about their respective axes. This rotation prevents the formation of blockages at the passage 25c.

In a preferred embodiment, the freeze-drying chamber, the formatting table, and the conveyor system are disposed generally laterally of one another, and the charging carriage and transfer table are mounted on a guide rail assembly 41 through 43, as shown in FIGS. 3 and 6 through 9. Alternatively, if the formatting table is used to both supply and remove containers to and from the freeze-drying apparatus, there would be no need for a removal conveyor system, and only the formatting table and freeze-drying apparatus would be located laterally of one another.

Since the products to be freeze-dried are frequently temperature sensitive, it may be desirable to cool the various components of the load/unload assembly. This can be achieved by cooling the ambient environment in which the load/unload assembly is employed, or by providing the various components of the assembly, for example the formatting table or the transfer table, with cooling channels (not shown) to be traversed by a coolant. The cooling channels could, for example, be welded to the underside of the tables 8 and 26 in the form of cooling coils, or be formed integrally with the table tops themselves. The apparatus described in the figures can be equipped with controls that would enable either partial or fully automatic execution of both loading and unloading the freeze-drying apparatus. Various sensors, for example initiators, filling level indicators, or light barriers, could be provided at various locations, and be operatively connected to a central control system. If the central control system is computer operated (for example a microprocessor) a control panel could be used to preselect work programs or sub-programs.

It is to be understood that the embodiments shown in the figures are for illustrative purposes only, and that the invention is capable of numerous variations. For example, as an alternative to the multiple transfer tables shown in FIG. 8, the same freeze-drying chamber arrangement, with its enlarged opening 6, could be loaded with a single transfer table having a selectively adjustable height. The dead space in the freeze-drying chamber would therefore be reduced by comparison to the FIG. 1 embodiment. Furthermore, the transfer table 8 could be rotatably mounted on the charging carriage 9, thus eliminating the need for dual pivoting gate portions on the frame assembly 14 in arrangements where the formatting table and freeze-drying chamber are located on opposite sides of the transfer table. Furthermore, the belt arrangement 25 could be provided at the side of the formatting table 26 currently occupied by edge 29.

Although the present invention has been described with reference to a specific embodiment, those of skill in the art will recognize that changes may be made thereto without departing from the scope and spirit of the invention as set forth in the appended claims.

We claim as our invention;

1. In a freeze-drying apparatus including a plurality of placement surfaces in a chamber, said placement surfaces being adapted and constructed to receive a plurality of containers holding a product to be freeze-dried, a load/unload assembly for loading said containers onto said placement surfaces before freeze-drying of said product and removing said containers from said placement surfaces after freeze-drying of said product, said load/unload assembly comprising the following:

a transfer table including a table top, said transfer table being both mobile and adjustable;

a frame assembly secured to said transfer table for movement relative thereto, said frame assembly being engageable with said containers to affect movement of said containers between said placement surfaces and said table top of said transfer table;

wherein said frame assembly includes at least one selectively pivotable gate portion for engaging said containers;
wherein said at least one gate portion comprises a pair of gate portions located on opposite sides of said frame assembly; and
a formatting table disposed adjacent said transfer table and adapted to receive said containers.

2. A load/unload assembly according to claim 1, further wherein said frame assembly is secured for movement along a first guide rail assembly attached to said transfer table.

3. A load/unload assembly according to claim 2, further comprising:
a charging carriage upon which is mounted a second guide rail assembly; and
said transfer table is secured for movement along said second guide rail assembly.

4. A load/unload assembly according to claim 1, wherein said frame assembly includes at least one selectively pivotable gate portion for engaging said containers.

5. A load/unload assembly according to claim 4, wherein said at least one gate portion comprises a pair of gate portions located on opposite sides of said frame assembly.

6. A load-unload assembly according to claim 1, wherein said frame assembly further comprises roller adapted to engage rail surfaces.

7. A load-unload assembly according to claim 5, further comprising a formatting table adjacent said transfer table and adapted to receive said containers.

8. A load/unload assembly according to claim 7, wherein said formatting table comprises the following:
belt means for transporting said containers to and from said formatting table; and
transfer means for transferring said containers between said formatting table and said belt means.

9. A load/unload assembly according to claim 8, wherein said transfer means comprises a displaceable stop adjacent an end of said belt means.

10. A load/unload assembly according to claim 9, wherein said belt means comprises an oblique guide member, whereby said containers on said belt means may be merged into a narrow passage from a multi-row configuration.

11. A load/unload assembly according to claim 7, further comprising means for varying the height of said formatting table.

12. A load/unload assembly according to claim 11, further comprising means for cooling said formatting table and said transfer table.

13. A load/unload assembly according to claim 7, further comprising a conveyor means for removing said containers from said transfer table.

14. A load/unload assembly according to claim 13, wherein said chamber, said formatting table, and said conveyor means are disposed generally laterally of one another, and said load/unload assembly further comprises guide means for guiding said transfer table into respective predetermined positions to cooperate with said chamber, said formatting table, and said conveyor means.

15. A load/unload assembly according to claim 14, wherein said guide means comprises the following:
a pin on said transfer table; and
respective pin guides on said chamber, said formatting table and said conveyor means, said pin guides being adapted to receive said pin;
whereby engagement between said pin and said respective pin guides secures said transfer table into said respective predetermined positions.

16. A load/unload assembly according to claim 1, wherein said table top of said transfer table and said placement surfaces are coated with plastic.

17. A load/unload assembly according to claim 1, further comprising retention means, associated with said placement surfaces, for retaining said containers in a generally upright position on said placement surfaces.

18. A load/unload assembly according to claim 17, wherein said retention means comprises means for inclining said placement surfaces with respect to a horizontal plane.

19. In a freeze-drying apparatus including a plurality of placement surface disposed in a chamber, said placement surfaces being adapted and constructed to receive a plurality of containers holding a product to be freeze-dried, a load/unload assembly for loading said containers onto said placement surfaces before freeze-drying of said product and removing said containers from said placement surfaces after freeze-drying of said product, said load/unload assembly comprising the following:
a transfer table including a table top, said transfer table being both mobile and adjustable;
a frame assembly secured to said transfer table for movement relative thereto, said frame assembly being engageable with said containers to affect movement of said containers between said placement surfaces and said table top of said transfer table;
wherein said table top of said transfer table comprises gas cushion means for providing substantially friction-free surfaces for receiving said containers
wherein said table top of said transfer table comprises a selectively actuatable articulated edge section; and
wherein said gas cushion means includes a plurality of bores passing through said table top; and
gas supply means for introducing an inert gas under pressure through said bores.

20. In a freeze-drying apparatus including a plurality of placement surfaces disposed in a chamber, said placement surfaces being adapted and constructed to receive a plurality of containers holding a product to be freeze-dried, a load/unload assembly for loading said containers onto said placement surfaces before freeze-drying of said product and removing said containers from said placement surfaces after freeze-drying of said product, said load/unload assembly comprising the following:
a transfer table including a table top, said transfer table being both mobile and adjustable;
a frame assembly secured to said transfer table for movement relative thereto, said frame assembly being engageable with said containers to affect movement of said containers between said placement surfaces and said table top of said transfer table;
abutment extensions disposed on said articulated edge section and engageable with said placement surfaces; and
proximity switch means for limiting actuation of said articulated edge section.

21. A method of loading containers onto placement surfaces disposed in a chamber of a freeze-drying apparatus, said method comprising the following steps:
- arranging said containers on a table top of a mobile and adjustable transfer table;
- positioning said table top into proximity with one of said placement surfaces;
- bringing at least a portion of a selectively actuable and retractable frame assembly into engagement with said containers;
- actuating said frame assembly to transfer said containers from said transfer table to said placement surface; and
- retracting said frame assembly;

22. A method according to claim 21, wherein said step of arranging comprises the following substeps:
- providing said containers on a formatting table corresponding in size to said transfer table;
- positioning said formatting table into proximity with said table top of said transfer table;
- brining said at least portion of said frame assembly into engagement with said containers; and
- actuating said frame assembly to transfer said containers from said formatting table to said transfer table.

23. A method according to claim 22, further comprising the step of maintaining said placement surfaces at a temperature below zero degrees centigrade during loading of said containers onto said placement surfaces.

24. A method for removing containers from placement surfaces disposed in a chamber of a freeze-drying apparatus, said method comprising the following steps:
- positioning a table top of a mobile and adjustable transfer table into proximity with one of said placement surfaces;
- brining at least a portion of a selectively actuable and retractable frame assembly into engagement with said containers; and
- actuating said frame assembly to transfer said containers from said placement surface to said transfer table.

25. A method according to claim 24, further comprising the following steps:
- brining said transfer table into proximity with a receiving portion of a conveyor system; and
- actuating said frame assembly to transfer said containers from said transfers table to said receiving portion of said conveyor system.

26. A method according to claim 25, further comprising the step of maintaining said placement surfaces at a temperature below zero degrees centigrade during removal of said containers from said placement surfaces.

* * * * *